(12) United States Patent
Müller

(10) Patent No.: US 6,360,580 B1
(45) Date of Patent: Mar. 26, 2002

(54) DEVICE AND METHOD FOR TESTING VEHICLE SHOCK ABSORBERS

(76) Inventor: Roland Müller, Bileskasteier Weg 15a, 66453 Gersheim (DE)

( * ) Notice: Subject to any disclaimer, the term of this patent is extended or adjusted under 35 U.S.C. 154(b) by 0 days.

(21) Appl. No.: 09/516,041

(22) Filed: Mar. 1, 2000

Related U.S. Application Data

(63) Continuation-in-part of application No. 08/793,935, filed as application No. PCT/DE95/01234 on Sep. 11, 1995.

(30) Foreign Application Priority Data

Jan. 10, 1994 (DE) .......................................... 44 32 286

(51) Int. Cl.$^7$ ............................................. G01M 17/04
(52) U.S. Cl. ...................................................... 73/11.04
(58) Field of Search ............................ 73/11.05, 11.07, 73/11.08, 11.09; 701/37, 29, 31

(56) References Cited

U.S. PATENT DOCUMENTS

| | | | |
|---|---|---|---|
| 3,690,145 A | * 9/1972 | Brisard | 73/11.08 |
| 3,811,316 A | * 5/1974 | Amendolia | 73/11.09 |
| 3,902,352 A | * 9/1975 | Buzzi | 73/11.08 |
| 3,937,058 A | 2/1976 | Hilbrands | |
| 3,981,174 A | 9/1976 | Himmler | |
| 4,103,532 A | * 8/1978 | Buzzi | 73/11.08 |
| 5,056,024 A | * 10/1991 | Stuyts | 73/11.08 |
| 5,369,974 A | * 12/1994 | Tsymrerov | 73/11.08 |
| 5,648,902 A | * 7/1997 | Honda | 73/11.08 |
| 5,665,901 A | * 9/1997 | Ilzig et al. | 73/11.08 |
| 5,756,877 A | * 5/1998 | Nozaki | 73/11.09 |
| 5,767,382 A | * 6/1998 | Buchanan | 73/11.08 |

FOREIGN PATENT DOCUMENTS

| | | |
|---|---|---|
| AU | 684227 | 3/1998 |
| DE | 4305048 | 8/1994 |
| EP | 0220115 | 10/1986 |
| FR | 2217687 | 9/1974 |

* cited by examiner

*Primary Examiner*—George Dombroske
(74) *Attorney, Agent, or Firm*—Henry M. Feiereisen

(57) ABSTRACT

In known devices for testing vehicle shock absorbers, the tires, which have a dampening effect, are not taken into account, so that the measurement results may be falsified by up to about 30%, depending on the tire pressure. In addition, when the wheels are mounted on the vehicle, no shock absorber characteristic curve may be measured, only individual values. In the disclosed device, the actuating variable "tire" is eliminated by a regulation process that consists in normalizing the resonance amplitude, a considerably more accurate measurement being thus obtained. In addition, the spring constant of the wheel suspension is determined before actually testing the shock absorbers, allowing defective springs to be detected. Finally, car body oscillations may also be determined, causing an additional precision gain. For the first time it becomes possible to determine a shock absorber characteristic curve without having to dismount the shock absorbers.

10 Claims, 5 Drawing Sheets

M1 - BODY MASS
C1 - BODY SPRING
K1 - SHOCK ABSORBER
M2 - WHEEL MASS
C2 - TYRE SPRING
M3 - APPLICATION MASS

M1 - BODY MASS
C1 - BODY SPRING
K1 - SHOCK ABSORBER
M2 - WHEEL MASS
C2 - TYRE SPRING

M1 - BODY MASS

C1a - SHOCK BEARING

C1 - BODY SPRING

K1 - SHOCK ABSORBER

M2 - WHEEL MASS

C2 - TYRE SPRING

K2 - TYRE DAMPER

DEVICE AND METHOD FOR TESTING VEHICLE SHOCK ABSORBERS

CROSS-REFERENCES TO RELATED APPLICATIONS

This application is a continuation-in-part of prior filed copending application, application Ser. No. 08/793,935, filed Mar. 7, 1997 which is a 371 of PCT/DE95/01234 filed Sep. 11, 1995.

BACKGROUND OF THE INVENTION

The present invention relates to a device for testing vehicle shock absorbers with at least one receptacle for receiving a wheel of a vehicle, means for exciting oscillations in the received wheel, and means for determining the amplitude of the oscillations at various frequencies as well as an evaluation and output unit.

Devices for testing vehicle shock absorbers are known, e.g. from the booklet "BOGE SHOCKTESTER." The booklet describes a stationary test station onto which a vehicle can be driven with two wheels simultaneously. A wheel receptacle adapted to oscillate vertically up and down initiates movement of the axle mass. After the drive is disconnected, the oscillation of the axle diminishes gradually and passes through the a resonance of the axle. The amplitude of the oscillation at resonance is physically and mathematically related to the dampening. The oscillation amplitude is received by an excursion sensor and displayed or recorded, respectively. The result of the measurement disadvantageously depends to a great extent on the oscillating system of the apparatus.

German Pat. No. DE-A-43 05 048 discloses a method for testing a shock absorber of an automobile, whereby a value referred to as a "dampening coefficient" is determined using a parameter estimation method. The estimated dampening coefficient is compared with a reference value to determine if the deviation between the estimated dampening coefficient and the reference value is within a tolerance range.

This method is therefore limited to determining of a single value of the system dampening and to comparing this single value with a reference value. The evaluation is furthermore based on an estimation method. It is therefore not possible to use this method for effectively assessing the condition of a shock absorber over a wider operating range.

U.S. Pat. No. 3,902,353 describes a method for testing shock absorbers installed in an automobile wherein a quantity related to the "dampening efficiency of a shock absorber" is determined, namely the phase between the excursion and the force of the wheel receptacle. This method, however, has the disadvantage that components, such as various masses and springs, are assumed to be known, which in reality may not be the case, for example in an automobile repair facility not dedicated to a specific vehicle brand. Moreover, only mass-produced vehicles with specified tires and air pressure can be tested.

U.S. Pat. No. 4,103,532 describes another method for testing shock absorbers, wherein an "equivalent viscous dampening coefficient" of one of the wheel suspensions of an automobile is determined. This equivalent dampening coefficient describes the dampening characteristics of the wheel suspension of a wheel, including the additional friction forces between the individual elements. Disadvantageously, however, although the measurement result includes effects from the other elements of the wheel suspension, these effects cannot be separated out. For example, if the dampening of a wheel suspension determined with this method is too small, then it cannot be determined why the dampening is too small. This result may be caused by a tire spring rate which is too high, or by a wheel mass which is too high.

The measurements obtained with the aforedescribed methods disadvantageously provide results only in the oscillation range of the wheel, without including the characteristics of the initial oscillation. It should be noted, however, that the mass of the body (load) of a vehicle or the spring rate of the body (lowering of the body) are equally important, since the shock absorber should also dampen the oscillations in this oscillation range.

SUMMARY OF THE INVENTION

It is thus an object of the present invention to provide an improved device for testing shock absorbers, obviating the afore-stated drawbacks.

In particular, it is an object of the present invention to provide an improved device for testing shock absorbers essentially independent of the tire pressure and the masses.

These objects, and others which will become apparent hereinafter, are attained in accordance with the present invention by providing a mechanism for determining the characteristics of the shock absorber while a wheel is mounted on a vehicle, wherein the mechanism includes means for determining the force supplied via the wheel receptacle to the oscillating system, which includes the shock absorber and is the spring of the vehicle.

Heretofore, the characteristics of a shock absorber, i.e. a force-velocity diagram, could only be tested on shock absorbers in special test stations after the shock absorbers are removed from the vehicle. When the shock absorbers are installed, only single values can be measured and compared with reference values, which is not sufficient to assess the condition of a shock absorber. According to one advantageous feature of the invention, that measurement values can be obtained easily and inexpensively, while side effects that cannot be controlled (such as the oscillating engine mass) do not significantly affect the measurement results.

According to another feature of the invention, a mechanism is provided for determining the power supplied via the wheel receptacle to the oscillating system which includes the shock absorber and the spring of the vehicle.

According to another feature of the invention, sensors are provided on the wheel hub, the wheel receptacle, and the body of the vehicle.

According to yet another feature of the invention, a force sensor is provided on the wheel receptacle, and an excursion and/or angle sensor is provided on the mechanism for initiating oscillations of the wheel. These features are provided to determine the characteristic values and characteristic curves, respectively, of m1 (body mass), m2 (wheel mass), c1 (body spring), c2 (wheel spring), and k1 (shock absorber). The other sensors disposed on the masses are not required, which advantageously makes the device efficient to operate.

Advantageously, means for recording and evaluating measurement data to produce separate values of the pull and push stage are provided.

According to yet another feature of the present invention, the excitation stroke of the mechanism for initiating oscillations in the wheel is variable, which allows an accurate determination of the amplitude at the resonance frequency.

According to another feature of the present invention, the sensors on the wheel hub, on the receptacle and the body of the motor vehicle, enable measuring of the spring constant of the elements of the wheel suspension. In this manner, values for determining the resonance frequency of the body and the relative movement between the body and the wheel hub, respectively, can be provided.

According to another feature of the present invention, means are provided for adjusting the level of the vehicle body.

Advantageously, the device is movable.

According to another feature of the present invention, an adjustable eccentric is provided for varying the excitation stroke.

Suitably, the output unit includes a display and/or printer.

BRIEF DESCRIPTION OF THE DRAWING

The above and other objects, features and advantages of the present invention will be more readily apparent upon reading the following description of a preferred exemplified embodiment of the invention with reference to the accompanying drawing, in which.

DETAILED DESCRIPTION OF PREFERRED EMBODIMENTS

Figure 1:
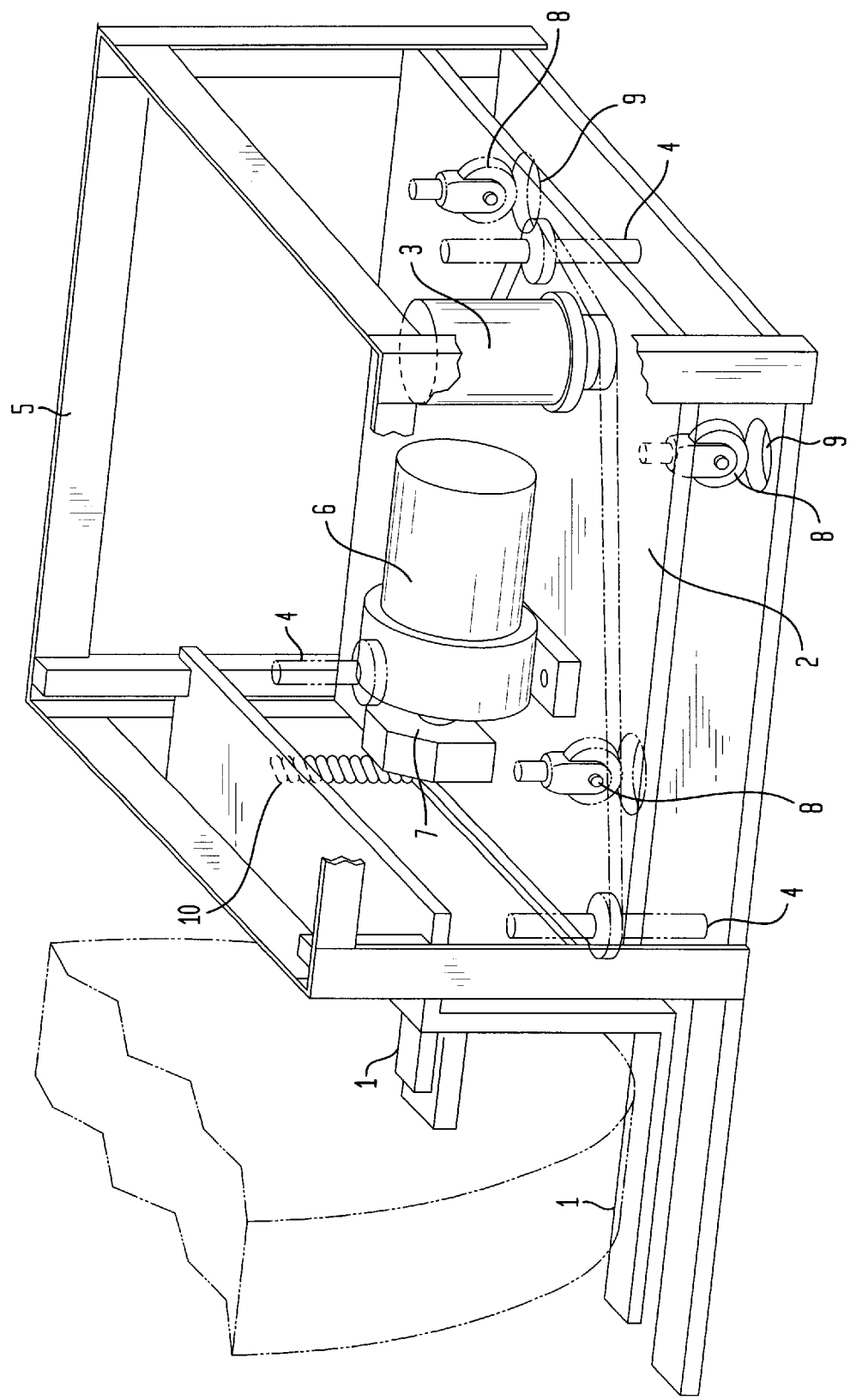
FIG. 1 is a schematic, perspective illustration of a device, in accordance with the present invention, for determining the power supplied to an oscillating system.

Throughout all the Figures, same or corresponding elements are generally indicated by same reference numerals.

The method according to the invention will be described hereinafter with reference to a measurement process based on determining the power supplied to the oscillating system. It will be assumed that the power supplied to the system which includes the shock absorber and the spring, is converted in the shock absorber which is the case, except for small friction losses.

As shown in FIG. 1, the device includes at least one receptacle 1 for receiving a wheel of a vehicle, with the receptacle 1 shaped like a fork and disposed on the outside of a housing 5 of the device. The receptacle 1 is movable in a vertical direction for raising and lowering the wheel. This is accomplished with the depicted device by raising the inside plate 2 connected to the receptacle 1. For this purpose, there is provided a servo motor 3 for vertically moving the inside plate 2 which is held in the respective position by, for example, threaded rods 4. To make the device movable, there may be provided on the underside of the inside plate 2 casters 8 which can protrude from holes 9 in the bottom of housing 5 when the inside plate 2 is positioned in its lowest position.

A main motor 6 driving an eccentric cam 7 is provided for initiating oscillations of the raised wheel. The eccentricity of the eccentric cam 7 can be continuously adjusted. The eccentric cam 7 is connected to the receptacle 1 for the wheel through spring means 10, for example through a coil spring. In this fashion, the wheel can be made to oscillate by applying a variable excitation stroke.

The device may, of course, be implemented in other ways; it may be provided with a hydraulic drive unit for operating hydraulic cylinders for raising and lowering the inside plate 2 as well as for operating a hydraulic cylinder for adjusting the eccentricity of the variable eccentric cam 7. In this way, a functional device according to the invention for testing vehicle shock absorbers may be implemented using just the hydraulic drive unit and a main motor 6.

In addition, sensors are provided for determining the oscillation amplitude at different frequencies, i.e. for measuring the excitation force (difference amplitude of spring means 10) and the oscillation amplitude of the wheel hub and the vehicle body. The latter two sensors can be used to measure the spring constant of the wheel suspension. In addition to the aforedescribed sensors for measuring the position of the body (body), of the wheel hub and of the wheel receptacle 1, which can measure the absolute movement of these measurement points and the relative movement between the measurement points, additional means are provided for determining the power supplied to the oscillating system. This can be done, for example, by measuring the force and velocity, including the correct phase, at the excitation spring 10, or by measuring the force and velocity, including the phase, at the eccentric cam.

All obtained results relate to the support point of the wheel. If values of the quantities which act directly on the measured objects (body spring, shock absorber) are required, then the mechanical advantage $i_D$ of the lever (FIG. 3), as determined by the formula $i_D=b:(a * \cos \alpha)$, will also have to be taken into account.

The measured results are conveyed to an evaluation unit which may be either a built-in computer or an external computer. The evaluation unit is in turn connected to a output unit which may be a display and/or a printer.

To better analyze the physical relationships, the oscillation system is mapped on an oscillation model (FIGS. 2 and 2a, respectively), making several permissible simplifications. For example, it will be assumed that the effect of the other springs which are not excited, may be neglected if the body of the vehicle remains at the same level during the measurement and if the amplitude of the body oscillation can be neglected. If the body does not move, then the coupling of the tested spring-shock absorber system to the other systems may be neglected It will be discussed later how this condition can be satisfied.

An additional permitted assumption is to neglect dampening by the tires which is small compared to the dampening by the shock absorber. The dampening force of the tire is added to the dampening force of the shock absorber.

Figure 2:
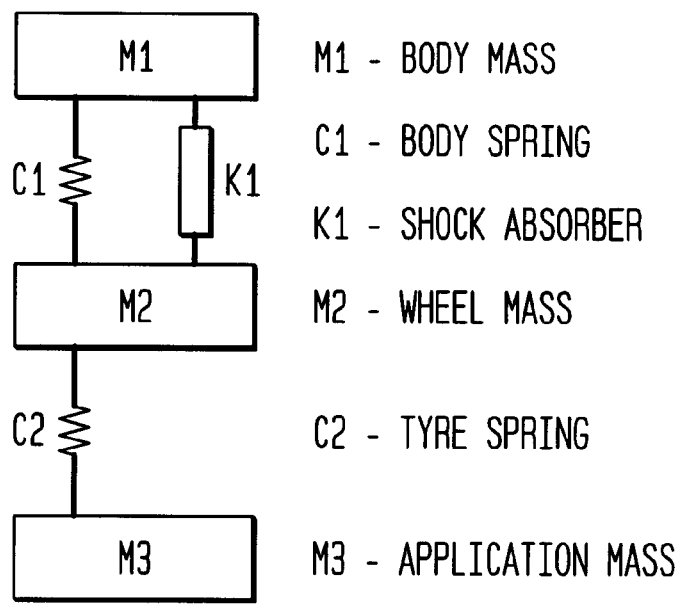
FIG. 2 is a schematic representation of a simple oscillation model with an excitation spring.

In the oscillation model depicted in FIG. 2, the masses are labeled m, the spring constants c and the excursions s. The mass m1 is the oscillating mass of the vehicle body (body mass) which can be determined from the static tire contact force and the wheel mass (½ of the mass of the axle). The spring constant c1 of the body spring is determined at the onset of the measurements, including possible nonlinear spring characteristics. The shock absorber which represents the actual measurement object, is labeled k1.

The mass m2 is the oscillating mass of the wheel and the wheel suspension (wheel mass) which can be determined from the dynamic characteristics of the system or can be all obtained from the manufacturer. These values, as far as they are known, can be stored in the evaluation unit and recalled therefrom.

The spring-like effect of the tire (tire spring) c2 can be determined at the maximum value of the supplied power, since the force can be measured at this frequency and the phase angle between the excursion of the excitation plate (wheel receptacle) and the excursion of the wheel hub is 90°. However, this is true only without excitation spring. With the excitation spring, the excitation force has to be determined by providing a force sensor integrated in the receptacle.

The mass m3 is the mass of the wheel receptacle 1 (excitation mass) which is known. The spring 10 used for exciting the oscillations, labeled c3 in FIG. 2, provides coupling of the excitation power to the oscillating system. Spring 10 is designed as probe spring for determining the excitation force acting thereon. In this case, the parameter choice of 90° no longer applies. The excitation itself is provided by the adjustable excitation stroke having an adjustable frequency. The center position of the exciting oscillation may be adjusted. In this way, the vehicle body can be controllably maintained at a constant level during the entire measurement, for example, by using a control circuit (not shown). Consequently, the parameters frequency, stroke, and center position for the excitation may be preset. The dampening is measured at a fixed, previously selected frequency which is held constant during the entire measurement. The power supplied to the oscillating system can be varied by adjusting the excitation stroke, so that the characteristics of the shock absorber can be recorded.

Testing of the shock absorber with the apparatus according to the invention is as follows:

1. First, the device is wheeled on casters 8 proximate to the wheel of a vehicle and the receptacle 1 are positioned around the wheel on both sides of the contact surface of the tire. Subsequently, the inside plate 2 of the device is raised by the servo motor 3, whereby the casters 8 are also raised and the housing 5 settles on the floor. Simultaneously, as a safety test before the actual testing of the shock absorber, the spring constant c1 of the body spring (wheel suspension) is determined in order prevent damage to the spring, so that the measurement results are not distorted by defective springs. The spring constant may also be compared directly with a stored reference value, with a message to be displayed in the event of significant deviations. Also determined and stored during the raising operation is the static contact force of the tire and the distance between the wheel hub and the body. In addition, the friction of the wheel suspension is determined during the raising operation. The contact force of the tire increases slowly when the wheel is raised, while the body is not yet moving because of the friction forces. The body only moves when the friction force is exceeded. In this way, the friction of the wheel suspension can be determined from the contact force of the tire and the distance between the wheel hub and the body.

2. The receptacle 1 is adjusted to a certain initial level. The static contact force of the tire is now measured at rest and the position of the body is recorded.

3. At this time, the main motor 6 is operated, sweeping the frequency through the region of the excitation frequencies, for example, from a minimum to a maximum excitation frequency, with a preferably small excitation stroke of the variable eccentric cam 7 for finding the resonance frequency of the wheel suspension. Hereby, the oscillation amplitude between body and wheel hub is observed. There will be several resonances with increasing frequency. The first resonance is called body resonance; it typically lies between 0.5 and 2.5 Hz and is not meaningful as a measurement since the body exhibits a large oscillation amplitude and can consequently not be considered at rest, as required. The second oscillation maximum is typically in the range between about 10 Hz and 15 Hz. This frequency is the desired measurement frequency, where the vehicle body exhibits only negligibly small oscillation amplitudes. This frequency is also advantageous for the transmission of power from the excitation to the shock absorber, since the supplied power has here a maximum.

4. In the next step, the previously determined resonance frequency is preset and the excitation stroke is increased step-by-step by adjusting the eccentric cam starting at zero. Each time, when a new oscillation state has stabilized (response time), a possible displacement of the body with respect to the reference level is countered by a level adjustment of the wheel receptacle (re-adjustment). At this point, the power supplied to the probe spring and the resulting oscillation amplitude between the body and the wheel hub is measured. The velocity can be derived from the excursion amplitudes and from the known frequency as the derivative of the difference of the excursions with respect to time.

$$V_{shock\ absorber} = d((S_{Body} - S_{wheel}) * \sin(2\pi * f * t))/dt$$

wherein
v=velocity
s=excursion amplitude
f=frequency
t=time.

The shock absorber force can be determined from the power supplied to the system (and absorbed by the shock absorber) and the velocity:

$$F_{shock\ absorber} = P/v (\text{power/velocity}).$$

The shock absorber force is the average value of the shock absorber force averaged between the pull stage and the push stage.

In general, the pull stage and the push stage in shock absorbers are designed differently in that the pull force is larger than the push force at the same velocity. This feature of a shock absorber causes the body to come closer to the wheel hub since the shock absorber is more easily compressed than pulled apart. The resulting difference force thus pre-biases the body spring. Since the decrease in body level resulting from the difference between the pull and push stage is compensated, as described above, by the level control means (in general: raising of the receptacle 1), this level adjustment can be used to determine the spring excursion used to pre-bias the body spring. The force difference between the pull and push stage can be determined from the measured spring constant and the spring excursion. The characteristics of the shock absorber can consequently be determined separately point-by-point for the pull stage and the push stage up to the power limit of the excitation (possible lifting of the wheel).

This characteristics can then be compared with a given set point characteristics. The dampening constant for the vehicle body can be determined from the mass of the body m1, the spring constant c1 and the shock absorber characteristics k1 according to the formula:

$$D_{body} = k1/(2 * \text{sqrt}((c1 * c2)/(c1 + c2) * m1)),$$

wherein
$D_{body}$=body dampening
k1=K-value for the shock absorber (F/v)

m1=body mass c1=body spring constant c2=tire spring rate

5. The wheel mass can now be determined from the parameters determined thus far and from the oscillation dynamics of the system. The wheel dampening is calculated from the values for the wheel mass m2, tire spring c2, body spring c1 and the characteristic value k1 of the shock absorber using a formula similar to the formula given under 4.

$$D_{wheel}=k1/(2* \text{sqrt}((c1+c2*m2)),$$

wherein

D=wheel dampening k1=K-value for the shock absorber (F/V)

m2=wheel mass c1=body spring constant c2=tire spring rate.

The expected dampening of both systems can now be determined by assuming a maximal permissible tires spring rate (worst-case scenario) for a new tire to be mounted, using formulas similar to those described in the sections 4 and 5 above.

6. It can thus be determined if the body and/or wheel of the vehicle complies with a certain specified minimum dampening value.

The shock absorber of only one wheel or all shock absorbers of the vehicle may be tested. The individual result or all results can be displayed or printed on the output unit. The display can, of course, include a graphic user interface with menu controls.

Alternatively, the characteristic curve of the shock absorber may be determined using a force sensor disposed on the wheel receptacle and an excursion and/or angle sensor disposed on the means for exciting wheel oscillations.

Figure 2A:
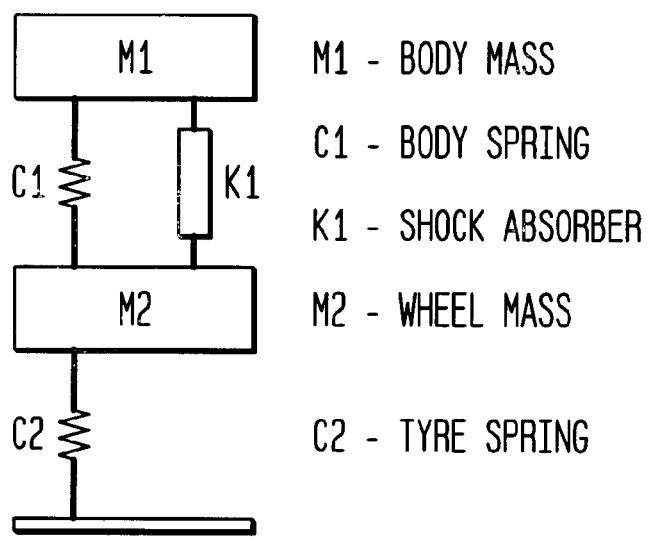
FIG. 2a is a schematic representation of a simple oscillation model without the excitation spring.

The characteristic values and characteristic curves, respectively, of the body mass m1, the wheel mass m2, the body spring c1, the tire spring c2 and the value characteristic k1 of the shock absorber can be determined, for example, using the oscillation model of the wheel suspension depicted in FIG. 2a. The following two methods can be employed.

However, before one of the methods is employed, a procedure has to be executed which brings the shock absorber to an "operating temperature" to eliminate undesired temperature effects. These effects can cause, for example, an increased viscosity of the oil contained in the shock absorber which would erroneously indicate an increased dampening power (K-value). It may also be advantageous to determine the spring constant of the tire before commencing the measurements. The calculation of the spring constant of the tire provides an initial control for both methods to eliminate erroneous calculations caused by a tire pressure which is to high or to low.

Heating of the Shock Absorber, Power Resonance Frequency, Calculation of the Tire Spring Rate To reduce the influence of temperature on the measurement results, the shock absorber is heated before the actual measurement values are acquired.

Accordingly, the frequency is set to a value at which the greatest power is dissipated by the wheel suspension. At this frequency, the product of force and velocity is a maximum. At this frequency, the shock absorber therefore heats up at the fastest rate, since almost the entire power is dissipated in the shock absorber. In addition, in this case, the phase between the stroke of the excitation and the stroke of the wheel hub is approximately 90°. The small deviations from this value are caused by the body mass which at this frequency still has a certain dynamics. The deviation from 90° decreases with increasing body mass. The spring rate of the tire can be computed from this value and the force supplied to the tires by the excitation plate.

$$c2=F/S*\sin(90°\text{-phi}),$$

wherein c2=tire spring rate

F=force amplitude of the excitation (corrected, see above)

S=attitude of the excitation displacement phi=phase difference between force and displacement of the excitation.

The first method calculates the values of the parameter of the exemplary model illustrated in FIG. 2 and FIG. 2a, respectively, by determining several support points.

As described above, the shock absorber is initially heated and the tire spring rate is determined. With this method, the amplitude and the phase of the force introduced into the system based on a sinusoidal excitation stroke is measured at different frequencies. To increase the accuracy of the result, the measurement data can be recorded separately for the pull and push stage of a shock absorber. However, the pull range and push range of the shock absorber can only be accurately separated if the phase of the movement of the wheel hub at the desired frequencies is known. The phase all of the wheel hub can be determined separately for each frequency using the tire spring rate. The effect of the tire care pressure is negligible over a wide range, since the tire spring rate was determined ahead of time.

The process proceeds as follows:

First, the static force with which the wheel suspension presses on the wheel support plate (receptacle), is determined. This force is then subdivided between the body mass and the wheel mass using a ratio of 6:1 to 10:1. The force is divided according to the previously determined total weight. If the total weight increases, the force ratio also increases.

Wheel Resonance

The maximum of the initial K-value (real part of force/velocity; F/v) in the range of the wheel resonance corresponds exactly to the maximum stroke between the body mass and wheel mass, and approximately to the wheel-excursion resonance frequency. The wheel dampening has to be determined at this frequency.

First, the excursion amplitude at the wheel m2 is determined using the tire spring rate c2, the measured force F and the frequency f.

Thereafter, the amplitude ratio of wheel amplitude to excitation amplitude is determined as follows:

$$A=S_{wheel}/S_{excitation},$$

wherein $S_{wheel}$=excursion amplitude at the wheel hub $S_{excitation}$=excursion amplitude of the excitation.

The wheel dampening is now computed according to the following formula:

$$D=0.5*\text{sqrt}(1+1/A)-0.5*\text{sqrt}(1-1/A),$$

wherein

D=dampening of the wheel (axle)

A=amplitude ratio.

As discussed above, the phase between the stroke of the excitation and the stroke of the wheel is approximately 90° at the power resonance frequency. The phase value can be determined with greater accuracy by corrected the phase value with the previously determined body mass. This yields the oscillation attitude of the wheel and the portion of the wheel mass which compensates the tire spring. The remaining portion of the wheel mass is compensated by the previously determined body spring rate and can therefore be calculated.

The spring rate $c_{total}$ acting at this frequency is composed of the sum of the body spring rate and the tire spring rate:

$$c_{total}=c1+c2,$$

wherein
  c1=body spring rate
  c2=tire spring rate.

The K-value of the shock absorber can be calculated in two ways, either by calculating first the force and then the velocity or vice versa.

Version a)

The force at the shock absorber is determined as follows:

$$F_{shock\ absorber}=\text{amplitude of the wheel receptacle}*(c1-c2)$$

The wheel mass does not affect the force at this frequency. The velocity at the shock absorber is determined by:

$$v_{shock\ absorber}=P/F(\text{supplied power/force}_{shock\ absorber})$$

Version b)

The velocity at the shock absorber corresponds to the velocity between the wheel and the body. The velocity of the body is so small that it can be neglected.

$$v_{shock\ absorber}=v_{wheel}$$

$$F_{shock\ absorber}=P/V(\text{supplied power/velocity}_{shock\ absorber})$$

Figure 3:
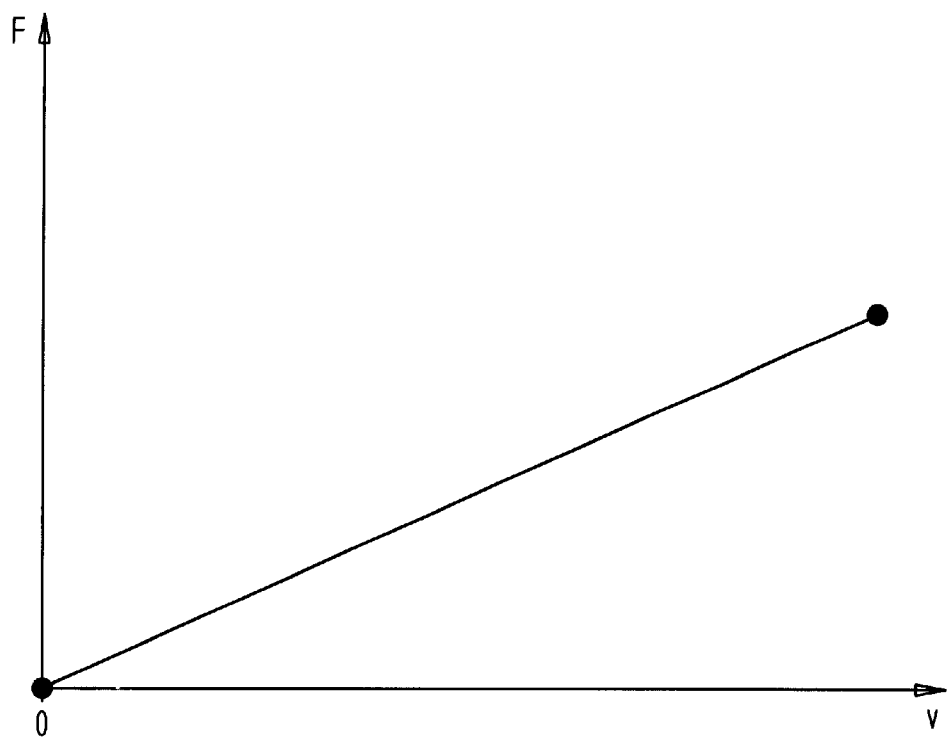
FIG. 3 is a simple characteristic curve of a shock absorber.

Accordingly, the K-value of the shock absorber and therefore the ratio between the force and velocity of the shock absorber has been determined at the greatest applied force. The characteristic curve of the shock absorber is obtained by connecting the force-velocity coordinate pair with the origin, as shown in FIG. 3.

Figure 3A:
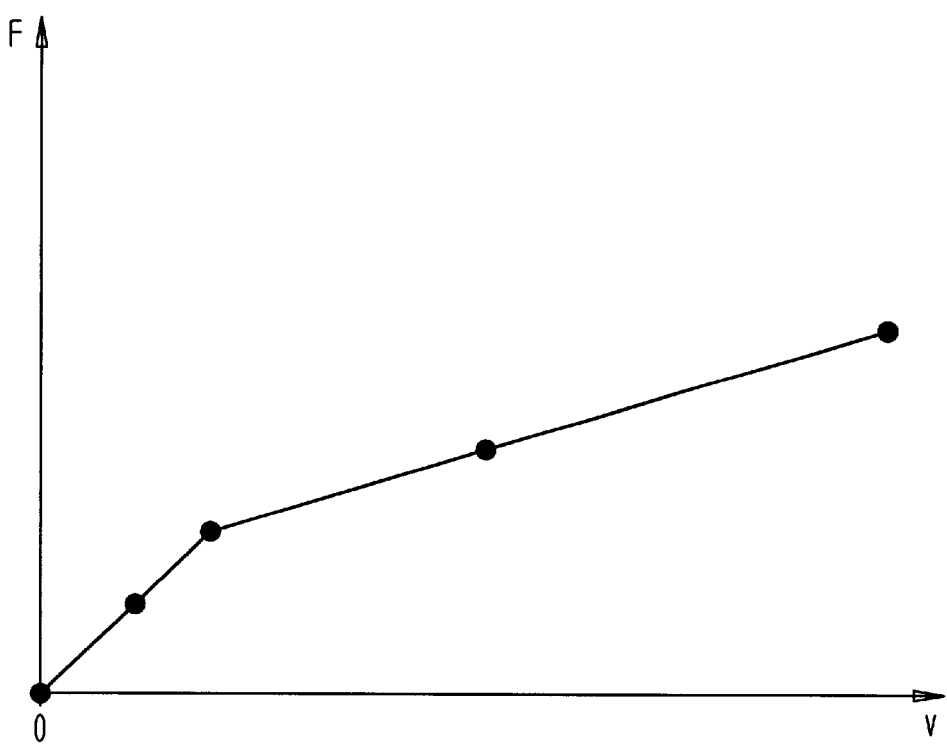
FIG. 3a is a characteristic curve of a shock absorber with several support points.
Figure 4:
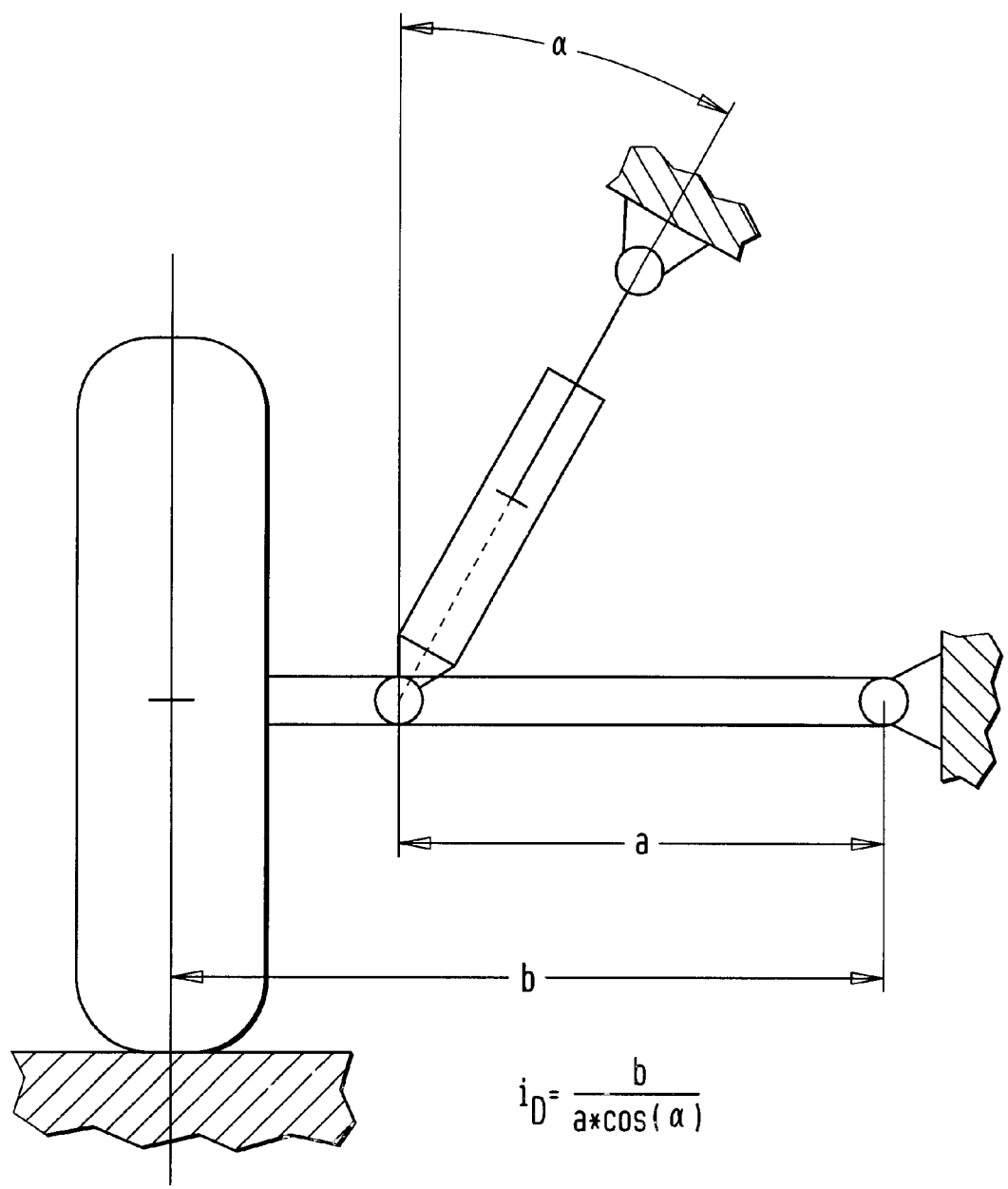
FIG. 4 is a schematic representation illustrating the transmission ratio of the wheel suspension.

Different K-values can be obtained for the shock absorber by varying the frequency. These K-values can be entered into the plot of characteristic curves to improve the quality of the result, as shown in FIG. 3a.

Since outside the wheel-power-resonance frequency the 90° condition is no longer satisfied, the actual phase has to be recomputed for each frequency using the tire spring rate.

BODY RESONANCE

The maximal of the initial K-value (real part of the force/velocity; F/v) in the range of the body resonance corresponds exactly to the maximum stroke between the body mass and the wheel mass and approximately to the body-excursion resonance frequency. The body dampening has to be determined at this frequency.

First, the body spring rate has to be determined using the estimated body mass and the resonance frequency.

$$\text{Body-resonance frequency } f=\text{sqrt}(m1/c_{total}),$$

wherein
  m1=body mass
  $c_{total}$=effective spring

The spring rate $c_{total}$ acting at this frequency is composed of a series connection of the body spring rate and the tire spring rate:

$$c_{total}=(c1*c2)/(c1+c2),$$

wherein
  c1=body spring rate
  c2=tire spring rate

Since the body-excursion resonance frequency and the tire spring rate are known, the body spring rate can be determined as follows:

$$c1=c_{total}\cdot c2/(c2-c_{total})$$

At this frequency, the wheel mass has only an insignificant impact on the oscillation dynamics. The body dampening can be determined in a similar manner according to the following formula:

$$D_{body}=k1/(2*\text{sqrt}((c1*c2)/(c1+c2)*m1)),$$

wherein
  D=body dampening
  k1=K-value (F/v) of the shock absorber
  m1=body mass
  c1=body spring rate
  c2=tire spring rate To obtain realistic initial values for the iteration, this "support point method" can also be executed following the "model iteration method", which will now be described.

The second method computes the values of the parameter of the exemplary model depicted in FIG. 2a using a model iteration.

As described above, the shock absorber is initially heated and the tire spring rate is determined. With this method, the amplitude and phase of the force applied to the system is measured over a broad frequency range based on a sinusoidal excitation stroke. To improve the accuracy of the result, the measured values can be recorded separately for the respective pull stage and push stage of a shock absorber. The push range and pull range of the shock absorber can only be exactly separated by this method, however, if the phase of the movement of the wheel hub across the entire frequency range is known. This can be computed separately at each frequency using the tire spring rate.

Figure 2B:
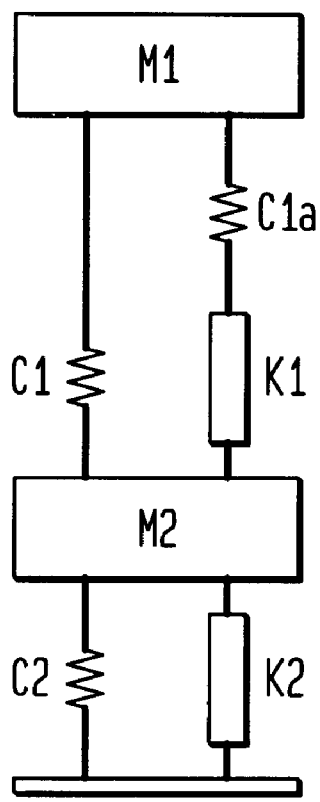
FIG. 2b is a schematic representation of a simple oscillation model with additional components.

This method is based on a computer-aided oscillation model of a wheel suspension of an automobile, as illustrated with reference to the example of FIG. 2a. This model is arranged similar to a real wheel suspension, with m1 depicted as body mass, m2 as wheel mass, m3 as excitation mass, c1 as body spring, c2 as tire spring, and k1 as shock absorber. If desired, other parameters, such as a resilient support for the shock absorber or a "tire damper", can be added to the model. A possible embodiment of this model is illustrated in FIG. 2b.

The result is computed with a complex and computation-intensive model iteration method, wherein the value of each parameter contained in the model is varied until the difference between respective input values force amplitude and phase of all values measured at the same frequency is minimized between the real wheel suspension and the computer model. This point is referred to as a global error minimum.

To obtain a uniform accuracy, the distribution of the measured points over the entire frequency range may be linear. Alternatively, to achieve a greater accuracy of the model at certain frequencies, the measured points may be grouped at those frequencies. Advantageously, the measurement data are recorded over the widest frequency range possible.

The result of this method provides the values for the parameters of the "wheel suspension", as illustrated with reference to the examples of FIG. 2a and FIG. 2b. All of the desired values, such as the dampening of the body and wheel mass, the characteristic curve of the shock absorber, the spring rate of the body and the tire spring, and the like, can be determined from the various parameters.

To check and, if necessary, correct the calculated values and to increase the confidence in the determined parameters, the "model iteration method" can also be applied after the "support point method".

The "model iteration method" based on a differential equation can also be used for non-sinusoidal and/or non-continuous excitation to determine the values of the linear parameters as well as of the non-linear parameters of a wheel suspension according to the aforedescribed model. This applies in particular to a shock absorber tester having a step excitation.

While the invention has been illustrated and described as embodied in a device and method for testing vehicle shock absorbers, it is not intended to be limited to the details shown since various modifications and structural changes may be made without departing in any way from the spirit of the present invention.

What is claimed as new and desired to be protected by Letters Patent is set forth in the appended claims:

1. A method of determining a characteristic function curve of a vehicle shock absorber installed on a vehicle having a vehicle body, comprising:
   (a) supporting a wheel of the vehicle on a receptacle capable of causing the wheel to oscillate with an oscillation frequency,
   (b) determining a shock absorber velocity (V) from the oscillation frequency of the receptacle and an oscillation amplitude between a hub of the wheel and the vehicle body,
   (c) determining a power transmitted from the receptacle to the wheel, and
   (d) computing a force (F) operating on the shock absorber from the transmitted power and the shock absorber velocity,
   whereby the characteristic function curve of the vehicle shock absorber is obtained as a F-V diagram.

2. A method according to claim 1, wherein the characteristic function curve is conveyed to an evaluation and output unit.

3. The method of claim 1, further comprising determining a resonance frequency of the wheel, wherein the oscillation frequency is equal to the resonance frequency.

4. The method of claim 3, further comprising determining a tire spring constant from a maximum value of the power transmitted to the wheel at the resonance frequency and at a phase angle of 90° as determined from the oscillation amplitude between the receptacle and the hub of the wheel.

5. The method of claim 4, further comprising determining a static spring constant of the vehicle body, and determining a wheel dampening and a body dampening from points on the characteristic function curve of the shock absorber.

6. The method of claim 1, further comprising measuring a change in a height of the vehicle body relative to a stationary support surface of the vehicle to determine a difference between a pull stage and a push stage of the shock absorber.

7. The method of claim 6, further comprising adjusting the height of the receptacle so as to maintain a constant height of the vehicle body relative to the stationary support surface of the vehicle.

8. The method of claim 1, wherein determining the characteristic function curve further includes repeating steps (b) through (d) for different frequencies.

9. A method of determining a characteristic function curve of a vehicle shock absorber installed on a vehicle having a vehicle body, comprising:
   (a) supporting a wheel of the vehicle on a receptacle capable of causing the wheel to oscillate with an oscillation frequency,
   (b) determining a static spring constant of the vehicle body,
   (c) determining a tire spring constant,
   (d) determining an oscillation amplitude of the receptacle and computing a shock absorber force (F) from the static spring constant, the tire spring constant and the oscillation amplitude, and
   (e) computing a shock absorber velocity (V) from a supplied power and the shock absorber force,
   whereby the characteristic function curve of the vehicle shock absorber is obtained as a F-V diagram.

10. The method of claim 9, wherein the tire spring constant is determined from a maximum value of a power transmitted to the wheel at a resonance frequency and at a phase angle of 90° as determined from an oscillation amplitude between the receptacle and a hub of the wheel.

* * * * *